(12) United States Patent
Dhayni

(10) Patent No.: US 9,729,377 B2
(45) Date of Patent: Aug. 8, 2017

(54) COARSE SYMBOL BOUNDARY DETECTION IN OFDM RECEIVERS

(71) Applicant: Optis Circuit Technology, LLC, Plano, TX (US)

(72) Inventor: Achraf Dhayni, Vallauris (FR)

(73) Assignee: Optis Circuit Technology, LLC, Plano, TX (US)

( * ) Notice: Subject to any disclaimer, the term of this patent is extended or adjusted under 35 U.S.C. 154(b) by 0 days.

(21) Appl. No.: 14/787,325

(22) PCT Filed: May 16, 2014

(86) PCT No.: PCT/EP2014/060131
§ 371 (c)(1),
(2) Date: Oct. 27, 2015

(87) PCT Pub. No.: WO2014/187748
PCT Pub. Date: Nov. 27, 2014

(65) Prior Publication Data
US 2016/0112236 A1 Apr. 21, 2016

(30) Foreign Application Priority Data
May 21, 2013 (EP) ..................... 13305649

(51) Int. Cl.
*H04L 27/26* (2006.01)
(52) U.S. Cl.
CPC ...... *H04L 27/2663* (2013.01); *H04L 27/2666* (2013.01)
(58) Field of Classification Search
CPC .......................... H04L 27/2663; H04L 27/2666
See application file for complete search history.

(56) References Cited

U.S. PATENT DOCUMENTS

| 6,084,905 A * | 7/2000 | Ishifuji | H04B 1/713 375/133 |
| 7,860,178 B2 * | 12/2010 | Kuo | H04L 27/2662 370/208 |
| 9,398,615 B1 * | 7/2016 | Zhang | H04W 74/0816 |

(Continued)

FOREIGN PATENT DOCUMENTS

EP 2 806 610 A1 11/2014

OTHER PUBLICATIONS

International Search Report issued in corresponding International application No. PCT/EP2014/060131, date of completion of the International search Jun. 10, 2014.
Written Opinion of the International Searching Authority issued in corresponding International application No. PCT/EP2014/060131, date of mailing Jun. 17, 2014.

(Continued)

*Primary Examiner* — Kenneth Lam
(74) *Attorney, Agent, or Firm* — Spencer C. Patterson; Grable Martin Fulton PLLC

(57) ABSTRACT

A method for determining a symbol boundary in a data packet belonging to a received OFDM signal is provided. The data packet includes a first training filed and a second training field, which begins with a guard interval. The method includes detecting the beginning of the data packet, and starting an automatic gain control process. The method further includes, after the automatic gain control process is locked, determining autocorrelation peaks and estimating the symbol boundary from times of the autocorrelation peaks.

20 Claims, 3 Drawing Sheets

(56) References Cited

U.S. PATENT DOCUMENTS

| | | | |
|---|---|---|---|
| 2004/0005018 A1* | 1/2004 | Zhu | H04L 27/2657 375/340 |
| 2004/0170197 A1* | 9/2004 | Mehta | H04L 27/2675 370/504 |
| 2004/0170237 A1* | 9/2004 | Chadha | H04L 27/2663 375/343 |
| 2004/0190560 A1* | 9/2004 | Maltsev | H04L 27/2675 370/503 |
| 2005/0163262 A1* | 7/2005 | Gupta | H04L 27/2656 375/343 |
| 2005/0163263 A1 | 7/2005 | Gupta et al. | |
| 2006/0140293 A1* | 6/2006 | Lai | H04L 27/2662 375/260 |
| 2007/0030797 A1* | 2/2007 | Baek | H04L 27/2675 370/208 |
| 2007/0280362 A1* | 12/2007 | Lin | H03G 3/3052 375/260 |
| 2008/0119152 A1* | 5/2008 | Kim | H03G 3/3052 455/234.1 |
| 2008/0219332 A1* | 9/2008 | Brehler | H03G 3/3078 375/219 |
| 2009/0304128 A1* | 12/2009 | Izumi | H04L 7/042 375/343 |

OTHER PUBLICATIONS

Office Action in related European Application No. EP 13 30 5649 dated Aug. 27, 2013.
Office Action in related European Application No. EP 13 30 5649 dated Nov. 8, 2013.
Office Action in related European Application No. EP 13 30 5649 dated Apr. 2, 2014.
Office Action in related European Application No. EP 13 30 5649 dated Apr. 22, 2015.
A. Mammela, et al.; "Trends in Wireless Communications"; Next Generation Wireless Communications Using Radio Over Fiber; Wiley & Sons; 2012; pp. 17-19.
Applicant's Amendments Received Prior to Examination in related European Application No. EP 13 30 5649 dated Oct. 4, 2013.
Applicant's Reply to Communication from Examining Division in related European Application No. EP 13 30 5649 dated Jan. 7, 2014.
Applicant's Reply to Communication from Examining Division in related European Application No. EP 13 30 5649 dated Sep. 11, 2014.
Applicant's Reply to Communication from Examining Division in related European Application No. EP 13 30 5649 dated Aug. 18, 2015.
Preparation and Summons to Attend Oral Proceedings in related European Application No. EP 13 30 5649 dated Apr. 19, 2015.

* cited by examiner

COARSE SYMBOL BOUNDARY DETECTION IN OFDM RECEIVERS

FIELD OF THE INVENTION

The invention relates to the field of multicarrier communications systems and more particularly to Orthogonal Frequency-Division Multiplexing (OFDM) systems including wireless OFDM systems

BACKGROUND OF THE INVENTION

Orthogonal Frequency-Division Multiplexing (OFDM), also referred to as "multi-carrier modulation" (MCM) or "discrete multi-tone modulation" (DMTM), splits up and encodes high-speed incoming serial data, modulating it over a plurality of different carrier frequencies (called "subcarriers") within a communication channel to transmit the data from one user to another. The serial information is broken up into a plurality of sub-signals that are transmitted simultaneously over the subcarriers in parallel.

By spacing the subcarrier frequencies at intervals of the frequency of the symbols to transmit, the peak power of each modulated subcarrier lines up exactly with zero power components of the other modulated subcarriers, thereby providing orthogonality (independence and separability of the individual subcarriers. This allows a good spectral efficiency (close to optimal) and minima inter-channel interference (ICI), i.e. interferences between the subcarriers.

For this reason, OFDM is used in many applications. Many digital transmission systems have adopted OFDM as the modulation technique such as digital broadcasting terrestrial TV (DVB-T), digital audio broadcasting (DAB), terrestrial integrated services digital broadcasting ISDB-T), digital subscriber line (xDSL), WLAN systems, e.g. based on the IEEE 802.11 a/g standards, Cable TV systems, etc.

However, the advantages of the OFDM can be useful only when the orthogonality is maintained.

To extract data from the OFDM signal, its timing should be accurately determined. Finding the symbol timing for OFDM system is nothing more than finding the beginning of the OFDM symbol. This can be achieved by finding any boundary in the preamble of the OFDM data packet. This task, implemented by OFDM receivers, is often referred to as "Symbol Boundary Detection" (SBD).

FIG. 1 illustrates such an OFDM data packet DP in accordance with IEEE 801.11 a/g WLAN standard.

The data packet DP includes a short Training Field, STF, comprising 10 identical short preambles s1, s2, s3 . . . s10. Each preamble includes 16 time samples of duration of 50 ns. The time duration of the STF preambles is therefore 0.8 µs. The Short Training Field STF has total duration of 8 µs.

The STF is followed by a Long Training Field, LTF. The LTF begins with a Guard Interval, GI2 and further comprise two identical LTF preambles, L1 and L2.

The time duration of the guard interval GI2 is 1.6 µs and it includes 32 time samples. The time duration of each LTF preambles is 3.2 µs and each of them include 64 time samples. The total duration of the LTF is 8 µs.

The LTF is followed by a SIG field which has a total duration of 4 µs. It comprises a guard interval GI and a signal field S.

The Rest of Packet field, ROP, includes data represented as symbols in which each symbol, Data1, Data2 . . . includes 64 time samples. Each symbol is preceded by a guard interval GI.

Usually, the symbol boundary detection (SBD) consists in determining the boundary between the last STF preamble s10 and the guard interval GI2, i.e. the boundary between the Short Training Field STF and the Long Training Field LTF.

Determination of the symbol boundary is very important since several OFDM mechanisms need this boundary in order to be initiated. Such mechanisms comprise for instance Carrier Frequency Offset (CFO) determination, Automatic Gain Control (AGC), Channel Estimation, Diversity selection, frame validation, etc.

As these mechanisms should be initiated as soon as possible in order to decode properly the ROP field containing the signal symbols, it is important to determine the symbol boundary as soon as possible during the reception of the training fields.

However, at the beginning of the STF, the received signal is not well conditioned, i.e. some of its parameters like its timing, its frequency, its amplitude, its phase, are not yet accurately determined. Therefore, in order to not postpone the determination of the symbol boundary any further, only a "coarse" symbol boundary determination is initiated at this stage, and a "fine" symbol boundary determination is initiated further, during reception of the LTF, to get a more accurate determination.

Several mechanisms have been proposed for coarse determination the symbol boundary, like auto-correlation on the STF.

This auto-correlation scheme exploits the periodic nature of the symbols in the STF, where a sample belonging to one preamble is repeated at the corresponding sample position in the subsequently received preambles. Therefore, the auto-correlation values rise as the receiver starts receiving the short preambles. Then, the auto-correlation values become stable for a time duration during which the STF is received, thereby forming sort of a plateau. A fall in the auto-correlation values marks the end of the STF, and the beginning of the Guard Interval GI2. The sample corresponding to this fall is recorded and used as estimation for the (coarse) symbol boundary.

However, due to high noise and low signal to noise ratio (SNR), the sampling instant corresponding to this fall may be recorded at a position that is offset from the correct boundary, due to the poor correlation metric of shot preambles at low SNR.

Accordingly, the accuracy of a coarse symbol boundary determination according to this auto-correlation scheme is poor.

However, even if only a coarse estimation is required at this step, its accuracy is important as many subsequent mechanisms are based on this first coarse estimation.

Some proposals have been made to improve the accuracy of the coarse symbol boundary determination, but they imply more complexity for their implementation.

It is however important to keep the implementations as easy as possible in order to keep low the manufacturing costs, the design costs, the silica foot-print, the energy consumptions, etc.

There is therefore a need for a solution permitting to improve the accuracy of the coarse determination of the symbol boundary, while not delaying its computing period (to avoid postponing the start of the subsequent OFDM mechanisms), and keeping the implementation simple.

SUMMARY OF THE INVENTION

This is achieved with a method for determining a symbol boundary in a data packet (DP) belonging to a received OFDM signal, said data packet comprising a first training filed (STF), a second training field (LTF) beginning by a guard interval (GI2), and said method comprising Detecting the beginning of the data packet (DP);

Starting Automatic Gain Control process;

After locking of said automatic gain control process, determining autocorrelation peaks, and estimating said symbol boundary from the times of said autocorrelation peaks.

According to embodiments of the invention, the method may comprise one or several of the following features:

said symbol boundary is estimated from a mean value of several autocorrelation peaks.

said detecting of the beginning of the data packet consists in detecting either:
  i. A frame, makes use of a normalized autocorrelation function computed on said received OFDM signal, or
  ii. Energy saturation.

determining autocorrelation peaks comprises using a normalized autocorrelation function computed on said received OFDM signal.

an autocorrelation peak is determined when during a set of autocorrelation samples it is above a predetermined threshold.

said symbol boundary is determined between a short training field and a long training field of said data packet (DP).

Another aspect of the invention relates to a computer program product comprising a computer readable medium, having thereon a computer program comprising program instructions, the computer program being loadable into a data-processing unit and adapted to cause execution of the method according to the above description when the computer program is run by the data-processing unit.

Another aspect of the invention relates to a receiver adapted to determine a symbol boundary in a data packet (DP) belonging to a received OFDM signal, said data packet comprising a first training filed (STF), a second training field (LTF) beginning by a guard interval (GI2), and said receiver comprising Means for detecting the beginning of the data packet (DP);

An Automatic Gain Control functional block (AGC);

A Frame validation functional block (FV) for, after locking of said automatic gain control process, determining autocorrelation peaks, and estimating said symbol boundary from the times of said autocorrelation peaks.

According to embodiments of the invention, the receiver may comprise one or several of the following features:

said symbol boundary is estimated from a mean value of several autocorrelation peaks.

said means for detecting of the beginning of the data packet comprises:
  i. A frame detection functional block (FD), adapted to make use of a normalized autocorrelation function computed on said received OFDM signal, and
  ii. An Energy saturation detection functional block (ESD).

said means for detecting of the beginning of the data packet detects said beginning when either a frame or energy saturation is detected.

determining autocorrelation peaks comprises using a normalized autocorrelation function computed on said received OFDM signal.

an autocorrelation peak is determined when during a set of autocorrelation samples it is above a predetermined threshold.

said symbol boundary is determined between a short training field and a long training field of said data packet (DP).

Another aspect of the invention relates to a communication device comprising such a receiver.

Further features and advantages of embodiments of the invention will appear from the following description of some embodiments of the invention, given as non-limiting examples, with reference to the accompanying drawings listed hereunder.

DETAILED DESCRIPTION OF EMBODIMENTS OF THE INVENTION

The present invention may apply to any communication devices comprising OFDM receiving means. Such communication device comprises any mobile communication device, including smartphones, but also tablets, or portable computers etc.

Figure 2:
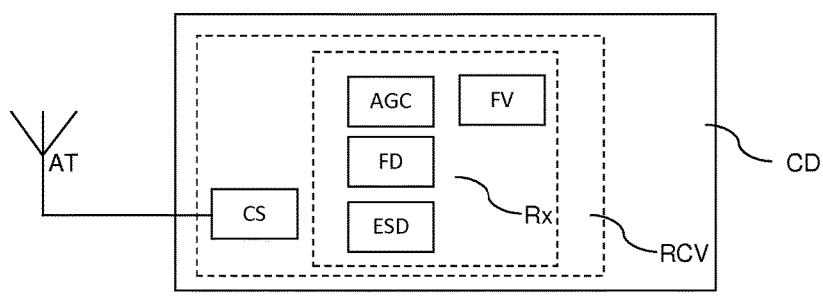
FIG. 2 shows a block diagram of a possible implementation of a communication device comprising OFDM receiving means.

Such a communication device is illustrated on FIG. 2 from a high-level functional point of view. The communication device CD comprises an OFDM receiver RCV, and many other circuitries which are not depicted as not related to the present invention, like energy powering circuits, USB connection circuits, computing means for supporting software applications, display controlling circuits, etc.

On FIG. 2, a few functional blocks have been depicted as parts of the receiver RCV. These should be understood as functional point of view of the architecture of the receiver RCV and of course several implementations are accessible to the man skilled in the art. However, in order to better understand the invention and its advantages, it seems more appropriate to describe it in terms of high-level functional architecture at this stage.

In order to reduce the overall energy consumption, when the OFDM receiving receiver RCV is not active, its circuits are shut down expect a Carrier Sensing function block CS.

The Carrier Sensing block CS is a classical circuit that measures permanently the level of the received OFDM signal power and noise within a certain bandwidth. Once the Carrier Sensing block CS has detected that there is an OFDM signal received by the antenna AT, it wakes up the receiving means Rx of the receiver apparatus RCV.

The receiving means Rx then starts the coarse symbol boundary determination process, which can be implemented according to the embodiment depicted on FIG. 2, by the functional blocks AGC, FD, ESD, FV . . . .

The receiving means can of course include other functional blocks, but it seems not relevant to depict them all for the clarity of the figure.

Figure 3:
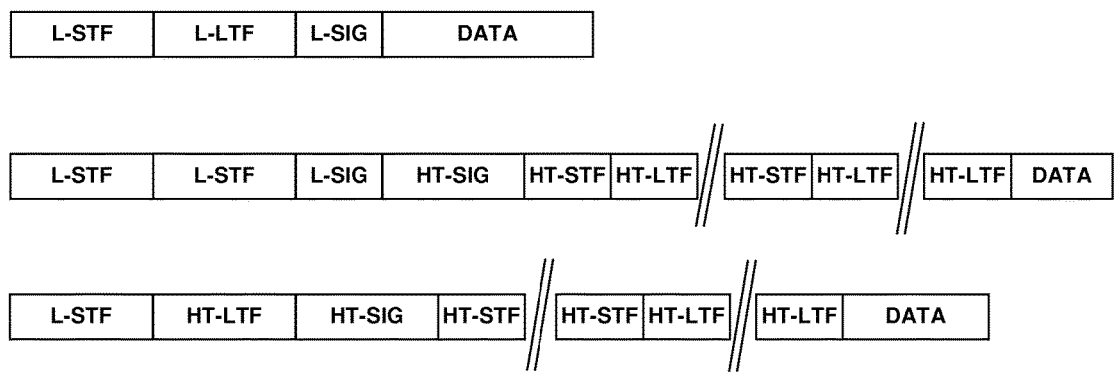
FIG. 3 shows different implementations of data packets DP according to the OFDM standards.

FIG. 3 shows different implementations of data packets DP according to the OFDM standards.

The first line represents non-HT PPDU (Physical layer Data Unit). The second line represents HT-mixed format PPDU. The third line represents HT-greenfield format PPDU. These formats are described in the 802.11 IEEE Standard.

The invention aims at determining a symbol boundary independently of the implemented PPDU for the data packets DP.

The first step of the method for determining the symbol boundary according to the invention consists in detecting the beginning of the received data packet DP.

Figure 4:
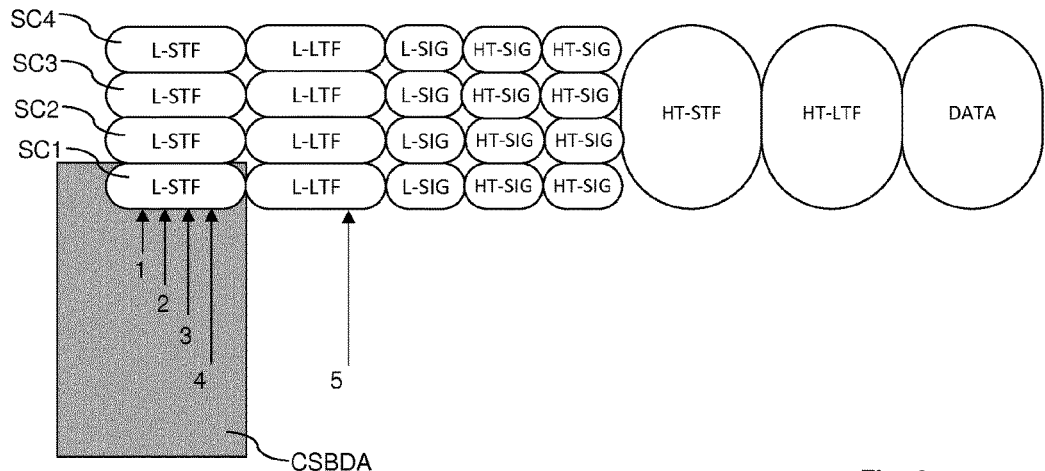
FIG. 4 shows the overall reception state machine for the OFDM receiver.

This step is depicted as "1" on FIG. 4 which shows the overall reception state machine for the OFDM receiver.

According to this state machine, the steps numbered 1, 2, 3, 4 are ordered, so that the end of one step can trigger the start of the following steps as it will be explained in the following descriptions.

Four sub-channels are depicted; SC1, SC2, SC3, SC4. The state machine associated to the coarse symbol boundary detection algorithm CSBDA is associated with a primary sub-channel SC1. This graphic representation of the state machines (the overall reception one, and the CSBDA one) enables to visually organize the scheduling of the various steps and mechanisms along the time axis, and with correspondence to the information under reception. For instance, it shows clearly that the coarse symbol boundary detection algorithm CSBDA is deployed during the reception of the STF (or L-STF) data. Reference 5 illustrates the fine symbol boundary detection process which can be deployed later, e.g. during the reception of the LTF.

This detection of the beginning of the received data packet of the step 1 can be implemented in various ways.

According to an embodiment of the invention, this step consists in setting the Automatic Gain Control, AGC to its maximum gain, and starting two processes which can run in parallel and are exemplified on FIG. 2 by the following functional blocks:

A frame detection functional block, FD;
An Energy Saturation Detection functional block, ESD.

The frame detection functional block FD makes use of normalized autocorrelation function computed on said received OFDM signal in order to detect a frame.

The detection can be based on the occurrence of autocorrelation peak(s) in the received signal. Several criteria can thus be used. According to an embodiment, the autocorrelation samples are stored into a buffer memory and two criteria are used jointly:

An autocorrelation peak is detected during a first set of autocorrelation samples, when the peak is above a first threshold; or An autocorrelation peak is detected during a smaller second set of autocorrelation samples, when the peak is above a higher second threshold.

The first criterion aims at detecting an autocorrelation peak when channel fading is present. Channel fading flattens down the autocorrelation peaks so that the first threshold should be low to detect them. To avoid false detection, the detection is integrated on a larger first set of samples.

The second criterion aims at detecting an autocorrelation peak when there is no (or few) channel fading. In this situation, the correlation peaks not flattened and the use of a higher second threshold makes it possible to base the detection on a smaller second set of samples.

For example, the first set is made of 24 autocorrelation samples and the first threshold is $R_{THR}=0.55$. The second set is made of 4 autocorrelation samples and the second threshold is $R_{THR}=0.9$.

These figures can be determined by experiments and/or simulation. They are dependent on the needed receiver sensitivity and the specified worse case of noise level and of channel fading. They are configuration parameters.

If at the end of the step (i.e. after the longest of the first and second set of autocorrelation samples has been received), none of the criteria has been met, it can be considered that no frame has been received and that the wake-up from the Carrier Sensing functional block CS was a false alarm. The process can then backtrack to non-active mode. The receiving means Rx can be switched off again, the Carrier Sensing mean CS can study the received signal to detect another potential signal.

The computation of the autocorrelation samples R(k) can be done in several ways.

The computation algorithm can be based on the following mathematical expressions:

$$R(k) = \frac{2 \cdot |\Lambda(k)|}{P(k-N_c) - P(k)}$$

where $$\Lambda(k) = \sum_{i=k-(N_a-1)}^{k} x^*(i-N_c) \cdot x(i) = |\Lambda(k)| \cdot e^{j\theta(k)};$$

and $$P(k) = \sum_{i=k-(N_a-1)}^{k} x^*(i) \cdot x(i)$$

And wherein:

$\Lambda(k)$ is the complex correlation between two received signal samples, with a lag of $N_c$ samples, over $N_a$ samples.

P(k) represents the sum of the powers of $N_a$ received samples;

x(i) is the complex received signal sample. The star represents the complex conjugate of a complex value.

For instance, $N_a=N_c=16$.

To reduce the variance of the correlation function estimation, the two components (numerator and denominator) can be filtered with a single pole integrator:

$$\begin{cases} \hat{\Lambda}(i) = (1-u) \cdot \hat{\Lambda}(i-1) + u \cdot \Lambda(i) \\ \hat{P}(i) = (1-v) \cdot \hat{P}(i-1) + v \cdot P(i) \end{cases}$$

Wherein u and v are defined as $2^{-MU\_ACOR}$ and $2^{-MU\_POW}$ respectively.

In this implementation, the filters are digital infinite impulse response low pass filters. They average the values of the denominator and numerator in order to reduce the noise.

Averaging is better to be done before dividing the denominator by the numerator $$\left(\text{according to } R(k) = \frac{2 \cdot |\Lambda(k)|}{P(k-N_c) - P(k)}\right)$$

because the division amplifies the noise, so it is better to reduce the noise before doing an operation that amplifies it.

The parameters MU_ACOR and MU_POW can be set to 3 and 4 respectively. These figures can be determined by simulations or experimentation as being compromises appropriate for a very good noise filtering while not filtering out each of the denominator and numerator wanted signals Λ(k) and P(k).

Accordingly, a frame is detected when the two following conditions are jointly satisfied:

$$\begin{cases} \hat{R}(i) \geq R_{THR} & \forall i \in \left] k-N; k \right] \\ P(i-N_c) + P(i) \geq 2 \cdot P_{NOISE\_THR} & \forall i \in \left] k-N; k \right] \end{cases}$$

This second condition can be added to avoid that the normalization of the function for a low power value would result in false detection.

As explained previously, these conditions are checked for the two thresholds, $R_{THR}$ (e.g. $R_{THR}$=0.55 or 0.9) with the appropriate number of samples N (e.g. N=24 or 4 respectively).

In addition to the frame detecting process, an energy saturation detection process can be started in parallel. This process is represented by the functional block ESD on FIG. 2.

This process consists in detecting the saturation of the Analog-to-Digital Converter (ADC) of the receiving circuitry Rx based on the received signal on the entire (or a substantial part) of the bandwidth.

Different embodiments are possible.

According to an embodiment, energy saturation is detected if one of the following conditions is met:

The first condition is that the received power P(i) is above a given threshold $P_{SAT\_THR}$ for a given number $N_{ABOVE\_SAT\_THR}$ of consecutive samples. In other words, the following expression should be satisfied:

$$P(i) \geq P_{SAT\_THR} \; \forall i \in \left] k - N_{ABOVE\_SAT\_THR}; k \right]$$

The second condition consists in checking for the saturation of $N_{SAT}$ real or imaginary samples in a window of $N_{SAT\_WINDOW}$ received samples.

Examples of values can be as follows:

$P_{SAT\_THR}$=0.4334 (linear value of −7.78 dB)
$N_{ABOVE\_SAT\_THR}$=20
$N_{SAT}$=10
$N_{SAT\_WINDOW}$=64

As explained earlier, the beginning of a data packet can be detected by two events: the detection of a frame or by the detection of energy saturation. The two processes are run in parallel, for instance as two independent functional blocks, respectively FD, ESD.

The first event to occur means that a beginning of a data packet has been detected and this triggers the next step 2 of the coarse symbol boundary detection algorithm.

This step 2 consists in starting the automatic gain control process (AGC).

This AGC process is a typical process of an OFDM receiver. Its deployment is important because the receiver may receive signals from different transmitters at different received power levels. The receiver may perform AGC and adjust its reception gain so that:

Strong signals are less amplified to avoid clipping of the Analog-to-Digital Converter (ADC) of the receiver and;

Weak signals are more amplified to occupy the full ADC range.

Thus, by using the proper receiver gain, clipping of the ADC and degradation due to ADC clipping may both be avoided.

Generally, the AGC process starts by tuning the gain to the maximum level and then decreases it gradually to find the good compromise between the two requirements mentioned above. In other words, the gain is decreased until a point just below the saturation of the ADC.

The AGC process can be implemented in various ways and the invention is independent of the actual implementation of the Automatic Gain Control.

After an adjustment time period, the gain of the AGC is stable. The AGC is said "locked". The gain can be used for the subsequent processes of the OFDM reception process. This time period depends on the environment but can be estimated around 4 μs or even less.

The stabilization of the gain can trigger an event outputted by the AGC functional block. This even can be used to start subsequent processes.

According to the invention, such a subsequent process consists in a frame validation step 3, embodied by the frame validation functional block FV in FIG. 2.

This step consists in determining autocorrelation peaks in the received signal.

This frame validation step 3 can be similar, from on algorithmic point of view, to the frame detection determination step previously described, with the difference that the threshold may be decreased. Also, it may not be required to make use of a double decision criterion with two thresholds.

As previously, the frame validation step 3 can make use of a normalized autocorrelation to validate a frame. The validation can be based on the occurrence of autocorrelation peak(s) in the received signal. Several criteria can thus be used. According to an embodiment, the autocorrelation samples are stored into a buffer memory an autocorrelation peak is detected during a set of autocorrelation samples, when the peak is above a threshold. This threshold can be set to 0.25, by experimentations and/or simulations.

From the determination of the autocorrelation peaks, the step 4 can estimate the symbol boundary. This step 4 can be performed together with the step 3, for example by performing the estimation of the symbol boundary as soon as an autocorrelation peak is determined. Alternatively, the estimation of the symbol boundary is performed when the last autocorrelation peak is determined.

This will be made clearer by referring to FIG. 5.

Figure 1:
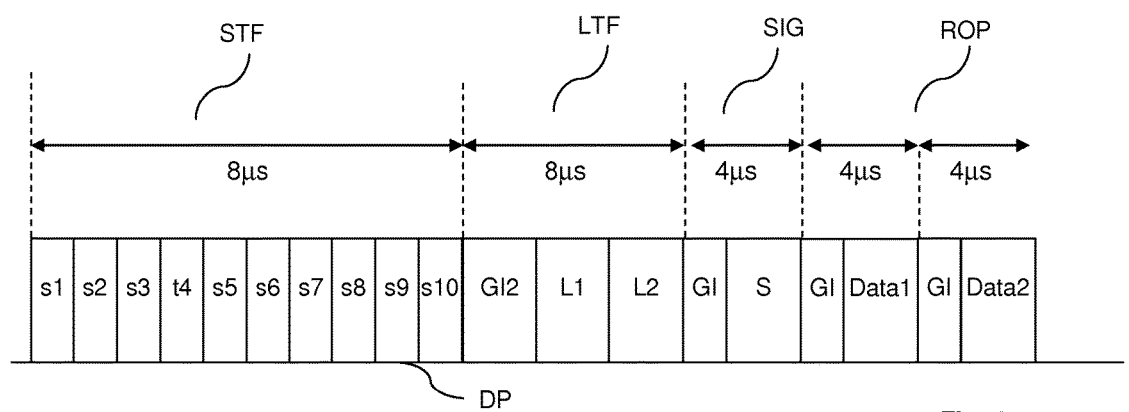
FIG. 1 shows a schematic diagram illustrating a data packet in accordance with IEEE 801.1 a/g standard.
Figure 5:
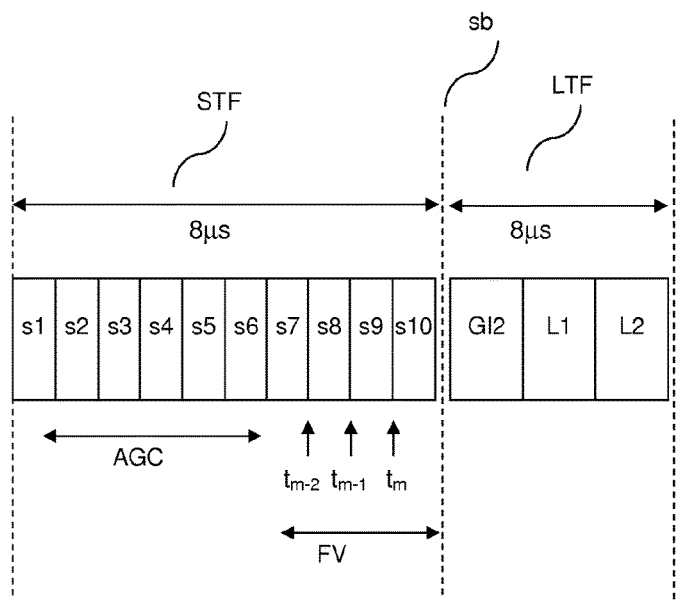
FIG. 5 shows a schematic diagram zooming on a STF and LTF to illustrate an example of application of the invention.

FIG. 5 depicts a STF and LTF similar to FIG. 1.

The AGC (Automatic Gain Control) lasts from the reception of the data packet until the end of the reception of the s6 short preamble for example.

Then, the subsequent step of determining the autocorrelation peaks starts at the beginning of the short preamble s7. Three autocorrelation peaks will be determined, depicted by the small vertical arrows.

The estimation can be performed from the times of these autocorrelation peaks.

Taking the last autocorrelation peak, by knowing its time $t_m$, the step 4 can consist in estimating the symbol boundary sb as $t_m$+0.8 μs (the duration of the preamble s10).

Taking the previous autocorrelation peak, by knowing its time $t_{m-1}$, the step 4 can consist in estimating the symbol boundary sb as $t_m$+1.6 μs (the duration of the preambles s9+s10).

Taking the last autocorrelation peak, by knowing its time $t_{m-2}$, the step 4 can consist in estimating the symbol boundary sb as $t_m$+2.4 µs (the duration of the preambles s8+s9+s10).

According to an embodiment of the invention, the symbol boundary sb is estimated from a mean value of several autocorrelation peaks, for example all of the determined autocorrelation peaks.

This embodiment allows minimizing the risk of a measurement error on one autocorrelation peaks. The possibility to deploy such an embodiment is an important advantage of the invention, brought by the timing optimization of the state machine.

By triggering the steps 3 and 4 as soon as the AGC is locked on a stable gain, the method according to the invention ensures that several autocorrelation peaks can be detected to estimate the symbol boundary. This enables then the other processes of the overall reception state machine to start on time, like the fine symbol boundary determination, CFO estimation, channel estimation, etc. Even the reception period of the STF is optimally used while enabling the coarse symbol boundary determination to achieve high level of accuracy.

The invention has been described with reference to preferred embodiments. However, many variations are possible within the scope of the invention.

The invention claimed is:

1. A method for determining a symbol boundary in a data packet belonging to a received Orthogonal Frequency-Division Multiplexing, OFDM, signal, said method comprising:
   detecting a beginning of a data packet while a fixed reception gain is applied to the received OFDM signal, wherein the data packet comprises a first training field and a second training field beginning by a guard interval, and wherein the beginning of the data packet is determined using at least autocorrelation peaks and at least a first threshold is used for detecting autocorrelation peaks during detection of the beginning of the data packet;
   starting an automatic gain control process when triggered by the detection of the beginning of the data packet; and
   after said automatic gain control process is locked, determining autocorrelation peaks in the OFDM signal during reception of the first training field, and estimating said symbol boundary from times of said autocorrelation peaks, wherein a second threshold, which is lower than the first threshold, is used for determining autocorrelation peaks used for estimating the symbol boundary.

2. The method according to claim 1, wherein said symbol boundary is estimated from a mean value of several among the autocorrelation peaks.

3. The method according to claim 1, wherein said detecting of the beginning of the data packet involves detecting both:
   a frame using a normalized autocorrelation function computed on said received OFDM signal, and
   an energy saturation.

4. The method according to claim 1, wherein the determining of the autocorrelation peaks comprises using a normalized autocorrelation function computed on said received OFDM signal.

5. The method according to claim 4, wherein one of the autocorrelation peaks is determined above a predetermined threshold during a set of autocorrelation samples.

6. The method according to claim 1, wherein said symbol boundary is determined between a short training field and a long training field of said data packet.

7. The method of claim 1, wherein the fixed reception gain is a maximum reception gain.

8. The method of claim 1, wherein a third threshold is also used for detecting autocorrelation peaks during detection of the beginning of the data packet and the third threshold is higher than the first and second thresholds.

9. The method of claim 1, wherein the determined autocorrelation peaks are used to estimate a plurality of symbol boundaries, each corresponding to a different symbol in the first training field.

10. The method of claim 1, wherein detection of the beginning of the data packet comprises jointly applying the following two criteria:
   (1) detecting an autocorrelation peak above the first threshold during a first set of autocorrelation samples; and
   (2) detecting an autocorrelation peak above a third threshold during a second set of autocorrelation samples,
      wherein there are more samples in the first set of autocorrelation samples than in the second set of autocorrelation samples, and the third threshold is higher than the first threshold.

11. A non-transitory computer readable medium storing a computer program comprising program instructions, the computer program being loadable into a data processor to cause the data processor to:
   detect a beginning of a data packet while a fixed reception gain is applied to the received OFDM signal, wherein the data packet comprises a first training field and a second training field beginning by a guard interval, and wherein the beginning of the data packet is determined using at least autocorrelation peaks and at least a first threshold is used for detecting autocorrelation peaks during detection of the beginning of the data packet;
   start an automatic gain control process when triggered by the detection of the beginning of the data packet; and
   after said automatic gain control process is locked, determine autocorrelation peaks in the OFDM signal during reception of the first training field, and estimating said symbol boundary from times of said autocorrelation peaks, wherein a second threshold, which is lower than the first threshold, is used for determining autocorrelation peaks used for estimating the symbol boundary.

12. A receiver configured to determine a symbol boundary in a data packet belonging to a received Orthogonal Frequency-Division Multiplexing, OFDM, signal, said receiver comprising:
   a memory; and
   a data processor coupled to the memory, wherein the data processor is configured to detect a beginning of a data packet while a fixed reception gain is applied to the received OFDM signal, wherein the data packet comprises a first training field and a second training field beginning by a guard interval, and wherein the beginning of the data packet is determined using at least autocorrelation peaks and at least a first threshold is used for detecting autocorrelation peaks during detection of the beginning of the data packet;
   start an automatic gain control functional process when triggered by the detection of the beginning of the data packet; and
   after said automatic gain control process is locked, determining autocorrelation peaks in the OFDM signal during reception of the first training field, and estimating said symbol boundary from the times of said autocorrelation peaks, wherein a second threshold, which is lower than the first threshold, is used for determining autocorrelation peaks used for estimating the symbol boundary.

13. The receiver according to claim 12, wherein said symbol boundary is estimated from a mean value of several among the autocorrelation peaks.

14. The receiver according to claim 12, wherein said detecting of the beginning of the data packet comprises detecting both:
a frame using a normalized autocorrelation function computed on said received OFDM signal, and
an energy saturation.

15. The receiver according to claim 14, wherein said detecting of the beginning of the data packet involves detecting said beginning when either a frame or an energy saturation is detected.

16. The receiver according to claim 12, wherein the determining of the autocorrelation peaks involves using a normalized autocorrelation function computed on said received OFDM signal.

17. The receiver according to claim 16, wherein one of said autocorrelation peaks is determined above a predetermined threshold during a set of autocorrelation samples.

18. The receiver according to claim 12, wherein said symbol boundary is determined between a short training field and a long training field of said data packet.

19. The receiver of claim 12, wherein detection of the beginning of the data packet comprises jointly applying the following two criteria:
(1) detecting an autocorrelation peak above the first threshold during a first set of autocorrelation samples; and
(2) detecting an autocorrelation peak above a third-threshold during a second set of autocorrelation samples,
wherein there are more samples in the first set of autocorrelation samples than in the second set of autocorrelation samples, and the third threshold is higher than the first threshold.

20. A communication device comprising a receiver according to claim 12.

* * * * *